(12) United States Patent
Selten et al.

(10) Patent No.: US 6,205,817 B1
(45) Date of Patent: *Mar. 27, 2001

(54) METHOD OF PRESSING TWO MOLD PORTIONS TOGETHER AND CONTROLLING AN INTERNAL GAS PRESSURE SO AS TO CREATE A HOLLOW CONE FOR RECEIVING EXCESS MOLDING MATERIAL

(75) Inventors: Wilhelmus N. M. Selten; Martinus P. W. Van Roosmalen; Hermanus N. Tuin, all of Eindoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,938

(22) Filed: Jul. 22, 1996

Related U.S. Application Data

(63) Continuation of application No. 08/441,713, filed on May 15, 1995, now abandoned, which is a continuation of application No. 08/106,007, filed on Aug. 13, 1993, now abandoned.

(30) Foreign Application Priority Data

Aug. 2, 1992 (EP) .................................. 92202545

(51) Int. Cl.[7] .............................. C03B 11/10; C03B 11/00

(52) U.S. Cl. ................................... 65/25.1; 65/68; 65/81; 65/182.2

(58) Field of Search ................................ 65/182.2, 25.1, 65/68, 85, 66, 77, 81

(56) References Cited

U.S. PATENT DOCUMENTS

| | | | |
|---|---|---|---|
| 1,560,062 | * 11/1925 | Kucera | 65/68 |
| 1,739,519 | * 12/1929 | Peiler | 65/25.1 |
| 3,484,510 | * 12/1969 | Lorazza | 65/68 |
| 3,661,547 | * 5/1972 | Nakayama | 65/77 |
| 3,796,557 | * 3/1974 | Sponseller | 65/77 |
| 3,961,927 | * 6/1976 | Alderson | 65/25.1 |
| 4,052,189 | * 10/1977 | Dockerty | 65/68 |

FOREIGN PATENT DOCUMENTS 2734773    2/1978   (DE) .

* cited by examiner

*Primary Examiner*—John Hoffmann
(74) *Attorney, Agent, or Firm*—Gregory L. Thorne

(57) ABSTRACT

A method of manufacturing a hollow cone having an open side and a cone tip. The method utilizing the steps of introducing a viscous material in a first mold portion, introducing a second mold portion and contacting the viscous material therewith, providing a force in an escape space so as to prevent the viscous material from flowing into the escape space, forming the open side of the hollow cone while preventing the viscous material from entering the escape space and causing the viscous material to enter the escape space to form the cone tip.

8 Claims, 4 Drawing Sheets

Figures 1A, 1B:
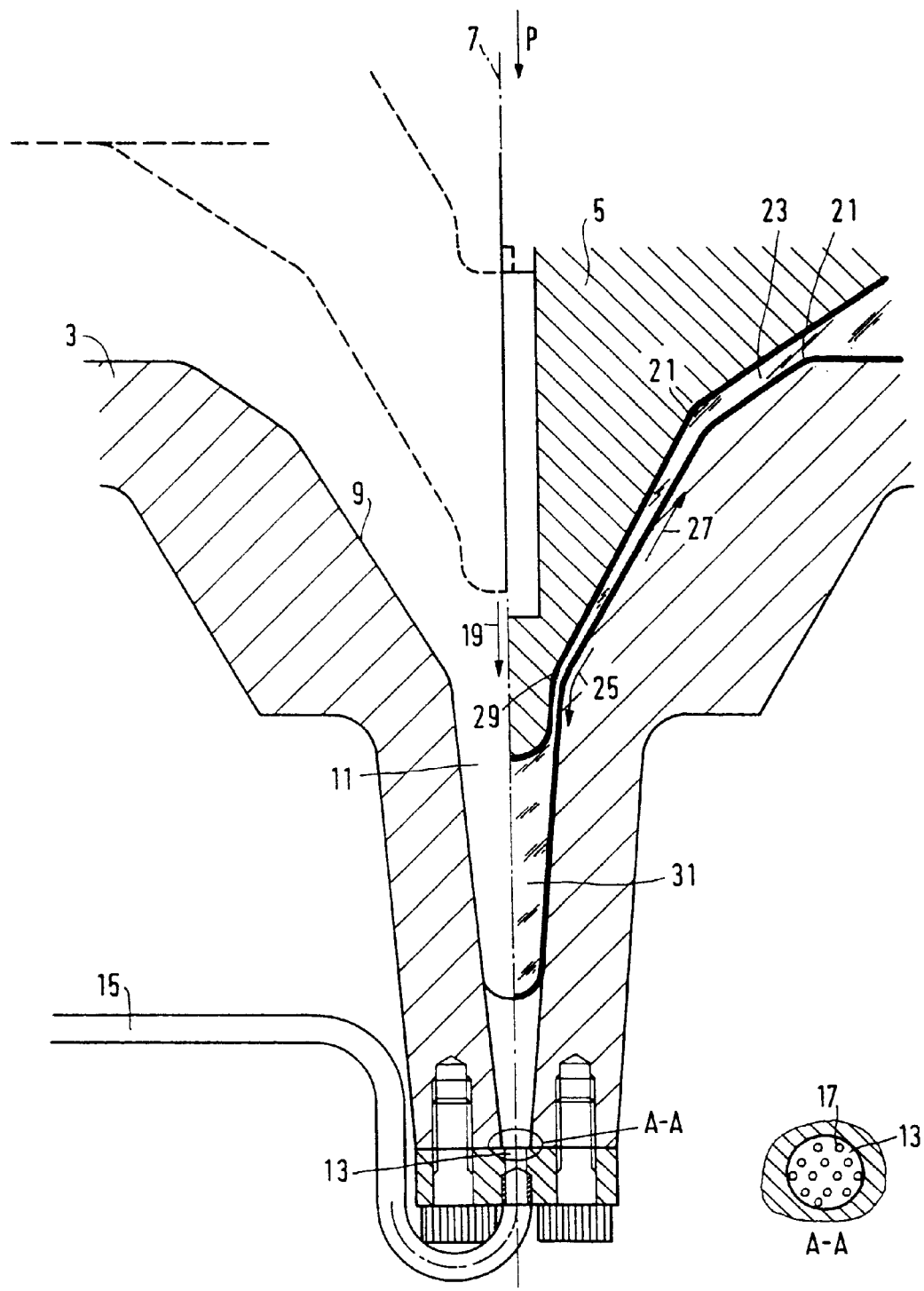

METHOD OF PRESSING TWO MOLD PORTIONS TOGETHER AND CONTROLLING AN INTERNAL GAS PRESSURE SO AS TO CREATE A HOLLOW CONE FOR RECEIVING EXCESS MOLDING MATERIAL

This is a file wrapper continuation of application Ser. No. 08/441,713, filed May 15, 1995, abandoned which is a continuation of application Ser. No. 08/106,007, filed Aug. 13, 1993, abandoned.

The invention relates to a method of manufacturing a hollow cone provided with an open side and a cone tip remote from the open side, whereby a parison or gob of viscous material is brought into a first mould part after which the parison or gob of material is moulded into the desired shape of the hollow cone by means of a second mould part.

The invention also relates to a device suitable for carrying out the method according to the invention, which device is provided with a first and a second mould part which are displaceable relative to one another.

The invention further relates to a cone manufactured by the method according to the invention and to a cathode ray tube provided with such a cone.

The term "viscous material" is understood to mean a material such as glass or synthetic resin with a viscosity of $10^2$–$10^7$ Pa.s.

BACKGROUND OF THE INVENTION

A method and a device suitable for manufacturing a cone are known from German Patent DE-C2 2734773.

During the manufacture of a cone, a parison or gob of material is introduced into a first mould part and then pressed into a desired shape by means of a second mould part. The first mould part has a funnel shape and the parison is introduced into a comparatively narrow portion of the funnel shape. The cone tip is formed in the narrowest portion of the funnel shape during moulding. The required wall thickness in the vicinity of the cone tip of the cone to be shaped is comparatively small compared with the rest of the cone. During moulding, the material is pressed into the narrowest portion of the first mould part, from which a portion of the material is pressed toward the wider portion of the first mould part through interspacings between the first and second mould parts. During moulding, the distance between the first and second mould parts becomes increasingly smaller, so that the material is forced to flow through ever narrower interspacings toward the wider portion of the funnel shape. Furthermore, a thin skin of cooled material is formed against the mould parts during moulding. This renders the interspacings through which material can flow even narrower. Comparatively high compression forces are necessary for forcing the material through these narrow interspacings. It is possible for the cone tip to break off from the rest of the cone with these high compression forces. This breaking of the cone tip is the result of the excessive pressure on the material which has already cooled down.

A solution proposed for this problem in the known device is a better temperature control in that the wall thickness of the mould parts in the vicinity of the cone tip to be formed is at least twice as thin as the wall thickness of the remaining portions of the mould parts.

A disadvantage of the known device is that the determination of the required wall thicknesses is inconvenient because new mould parts are to be manufactured each time for changing the wall thicknesses.

SUMMARY OF THE INVENTION

The invention has for its object to provide a simple method for the manufacture of a hollow cone by which the said disadvantages are avoided.

According to the invention, the method is for this purpose charactered in that a space for the escape of material becomes accessible in the vicinity of the cone tip to be formed and adjoins the first mould part at the moment that the pressure of flow present in the material in the vicinity of the cone tip to be formed exceeds a previously defined value.

The material which during moulding cannot or can hardly flow through the interspacings between the mould parts toward the wider portion of the funnel shape will try to escape to an escape space. The entrance to the escape space, however, is blocked until the flow pressure in the material in the vicinity of the cone tip exceeds a previously defined value and then the escape space becomes accessible. The pressure in the material in the vicinity of the cone tip in this way never becomes higher than a predetermined value.

A blocking mechanism which is comparatively easy to provide and in which the previously defined value of the admissible pressure in the material in the vicinity of the cone tip can be easily changed in an embodiment of the method according to the invention is characterized in that the escape of the material into the escape space is prevented by means of a gas pressure applied in the escape space until the pressure present in the material has become greater than the gas pressure.

The desired gas pressure level is experimentally determined, while the gas pressure may be readily changed so as to optimize the moulding process.

An alternative embodiment of the method according to the invention is characterized in that, after the parison or gob of material has been introduced into the first mould part, the parison is kept floating in the first mould part by means of the gas pressure until moulding starts.

The time between the moment the viscous parison or gob of material is introduced into the first mould part and the start of the moulding process is in practice a few seconds. A cold layer arises in the parison in all locations where the parison touches the walls of the mould, because the parison transfers heat to the colder mould wall. The formation of the cold layer, especially in locations where the cone to be formed has a comparatively thin wall, means that the required compression force is comparatively great. Sagging of the parison by its own weight is prevented in that the parison is kept floating in the first mould part until moulding starts, so that the contact surface area between the parison and the mould remains comparatively small and only a comparatively small cold layer is formed before moulding starts. Owing to this measure, the required compression force is comparatively small, which contributes to the prevention of cone tip fracture.

A further embodiment of the method according to the invention is characterized in that the formed cone is pressed from the first mould part by means of the gas pressure after moulding.

The removal of the moulded cone from the first mould part is facilitated thereby. It is noted that the use of compressed air for stripping the formed cone from the mould is known per se from German Patent Application DE 2001977. In the method according to the invention, however, the gas pressure is used both for preventing cone tip fracture and for removing the formed cone from the mould.

A yet further embodiment of the method according to the invention is characterized in that the gas pressure is adjustable during the manufacture of the hollow cone.

This renders it possible to adapt the gas pressure to the desired flow pressure of the viscous material at any moment during cone manufacture. The relevant pressure gradient is experimentally determined.

The invention also has for its object to provide a device for the manufacture of a hollow cone by which the disadvantages of the known device are avoided.

The device according to the invention suitable for carrying out the method according to the invention is characterized in that an escape space with closing possibility merges into the first mould part.

The escape space is not accessible to the parison or gob of material until the moment the flow pressure in the material exceeds a previously defined value. The term "with closing possibility" in relation to the escape space is accordingly understood to mean in this connection that the escape space can be blocked in such a manner that no material can escape into the escape space.

An embodiment of a device suitable for carrying out the method according to the invention, in which the escape space is initially kept inaccessible by means of gas pressure until the flow pressure in the material has become greater than the gas pressure, is characterized in that the escape space is provided with a gas pressure connection.

The desired gas pressure is applied in the escape space through the gas pressure connection. The use of gas for rendering the escape space temporarily inaccessible has the advantage that no moving mechanical parts need be used in and around the hot escape space (400° C.). Moving parts may cause malfunctioning and are subject to wear.

A further embodiment of a device suitable for carrying out the method according to the invention is characterized in that the escape space is funnel-shaped, a comparatively large open side of the escape space merging into the first mould part and a comparatively small open side of the escape space being connected to the gas connection.

Owing to the funnel-shaped escape space, the cone can be readily pressed from the escape space and the mould part after moulding.

BRIEF DESCRIPTION OF THE DRAWING FIGURES

Figure 2:
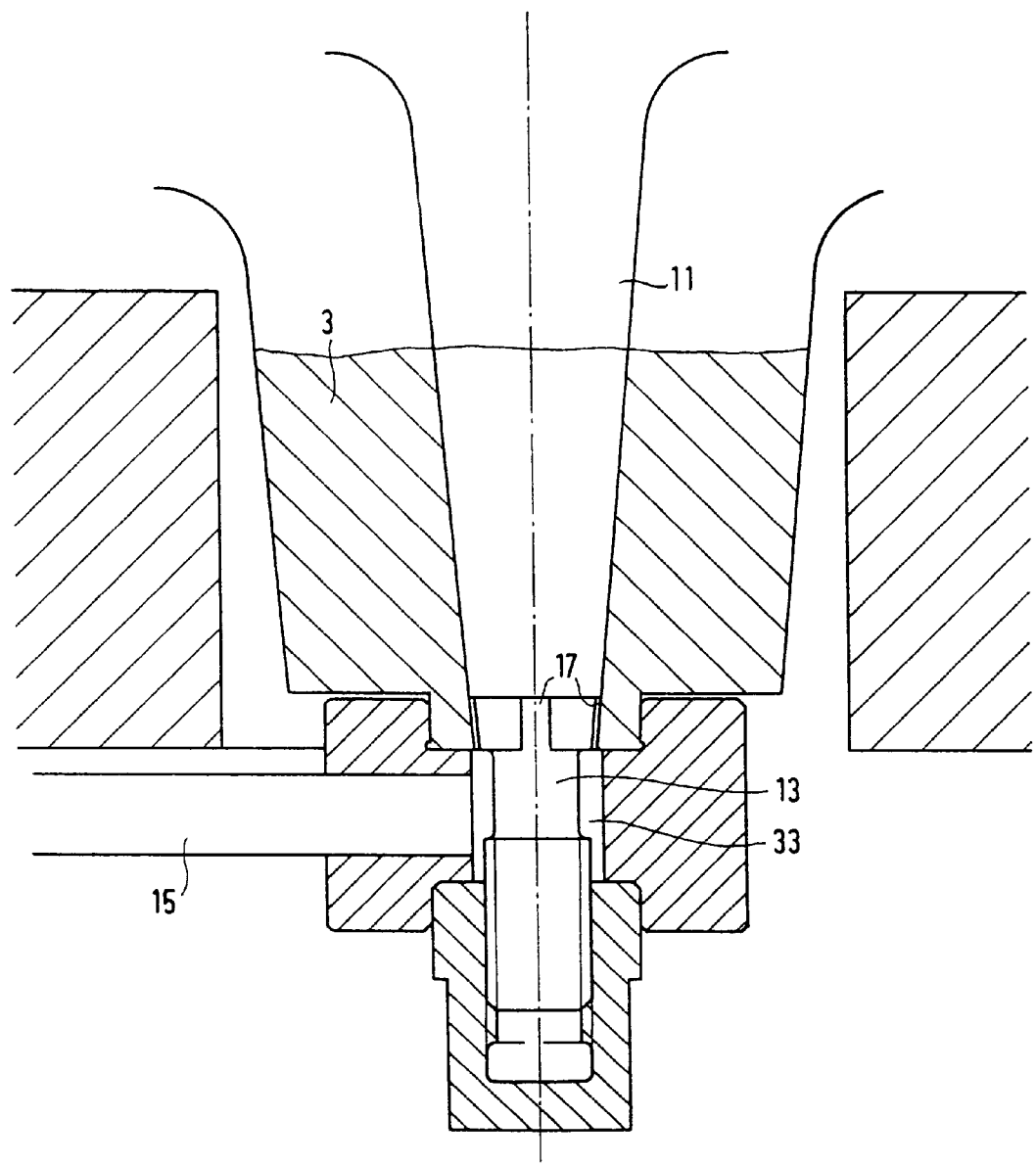
Figure 3A:
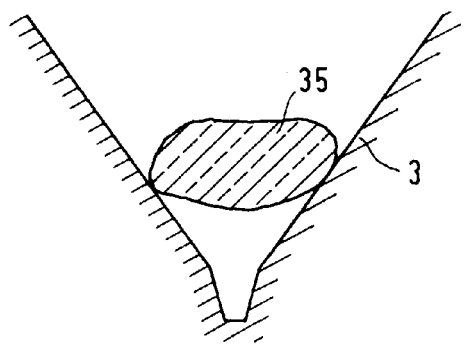
Figure 3B:
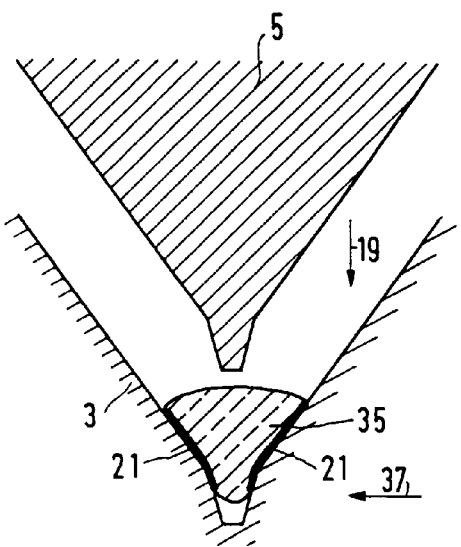
Figure 4A:
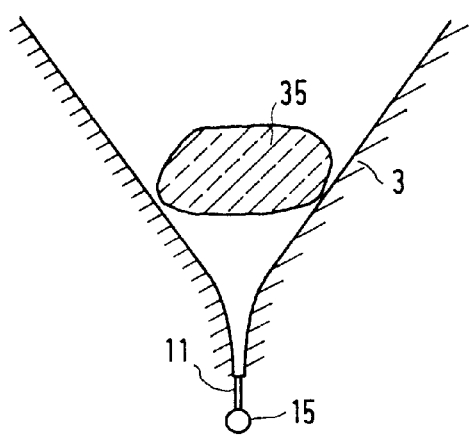
Figure 4B:
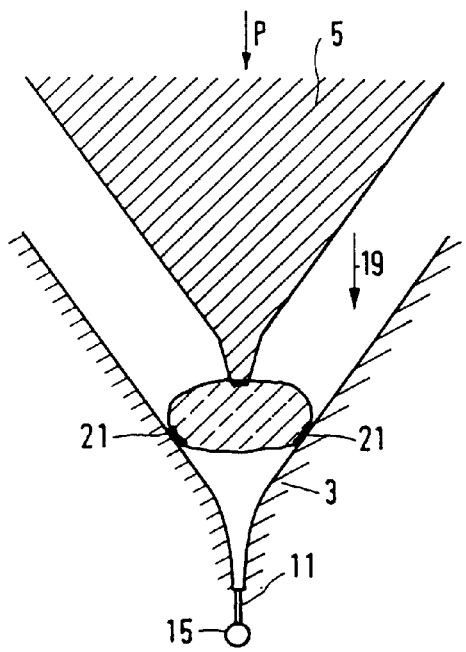
Figure 5:
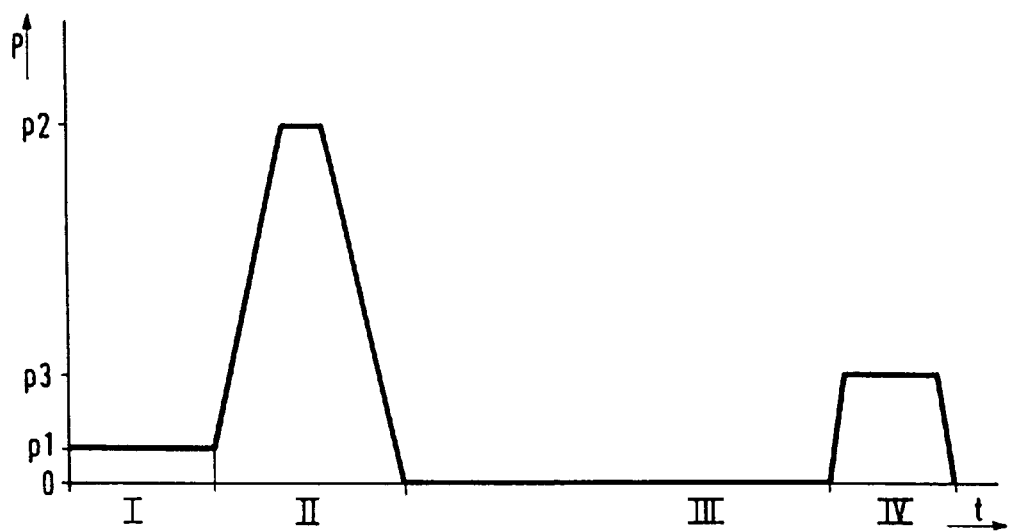
Figure 6:
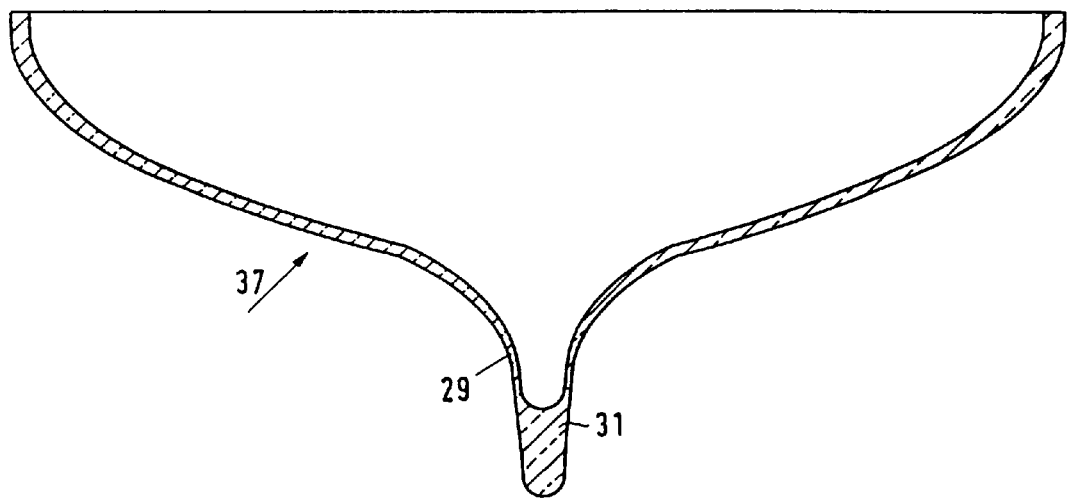

The invention is explained in more detail with reference to the drawing, in which FIGS. 1a and 1b diagrammatically show an embodiment of a device according to the invention, FIG. 1a showing a cross-section and FIG. 1b a plan view of a detail of the device shown in FIG. 1a, FIG. 2 diagrammatically shows a cross-section of an alternative embodiment of a device according to the invention, FIGS. 3a and 3b show the manufacture of a cone according to the prior art, FIGS. 4a and 4b show the manufacture of a cone by a method according to the invention, FIG. 5 shows the pressure gradient of the gas pressure applied in the escape space during manufacture of a cone, and FIG. 6 shows a cone manufactured by the method according to the invention.

DESCRIPTION OF THE PREFERRED EMBODIMENTS

FIGS. 1a and 1b show a device which forms part of a moulding press. The device is provided with a first mould part 3 and a second mould part 5 which is displaceable relative to the first mould part 3 along an axis 7. The first mould part 3 comprises a funnel-shaped portion 9 and an escape space 11. The escape space 11 is connected to a gas connection 15 through a gas-transmitting filter 13. The gas-transmitting filter 13 is provided with comparatively small channels 1,7 as shown in FIG. 1b, which run parallel to the axis 7. A parison of heated glass with a viscosity of $10^3$–$10^4$ Pa.s is introduced into the first mould part 3, upon which the second mould part 5 is displaced in the direction of the arrow 19 and the glass parison is moulded into the desired shape between the two mould parts. Different positions of the second mould part 5 are indicated with broken lines. Gas is introduced into the escape space 11 through the gas connection 15 and a gas pressure is adjusted such that the glass cannot flow into the escape space. The gas may be air, nitrogen, or some other gaseous medium. In those locations where the glass lies against the mould parts the glass will cool down comparatively strongly and a thin layer of glass 21 of comparatively high viscosity will be formed on both mould parts 3 and 5. The glass which has not yet cooled down so strongly is pressed down and up through an interspacing 23 present between the layers 21 in the direction of the arrows 25, 27, respectively. The compression force P required for this increases in proportion as the interspacing 23 becomes narrower. At a certain moment the pressure in the glass in the vicinity 29 of the cone tip to be formed will become greater than the gas pressure prevailing in the escape space 11. From that moment the glass will flow into the escape space 11. After moulding, the second mould part 5 is displaced in a direction opposite to the arrow 19. The moulded cone is subsequently pressed from the first mould part 3 by the gas pressure. The escape space 11 is funnel-shaped to facilitate stripping of the moulded cone from the first mould part 3. The gas-transmitting filter 13 is provided with channels 17 whose cross-sectional dimensions (0.05–0.3 mm) are so chosen that the glass cannot penetrate these channels owing to its viscosity when it is pressed against the gas-transmitting filter 13. In practice, the aim will be to prevent this penetration by means of a good pressure control.

FIG. 2 shows an alternative embodiment of an escape space 11 provided in the first mould part 3. The solid gas-transmitting filter 13 situated in the escape space 11 is provided with four channels 17 at its circumference channels are connected to the gas connection 15 via a chamber 33.

FIGS. 3a and 3b diagrammatically show an aspect of glass moulding according to the prior art. FIG. 3a shows a mould part 3 into which a glass parison 35 has been introduced. It then takes a few seconds in practice before moulding is started. During this time the glass parison 35 sinks into the bottom position of the mould part 3 under its own weight. This is shown in FIG. 3b. A comparatively cold layer 21, which increases in thickness during moulding, arises in all locations where the glass touches the mould part 3. The compression force required becomes comparatively high at the end of the moulding process owing to the presence of the cold layer 21 in that portion of the first mould part 3 where the cone to be formed has comparatively thin walls.

FIGS. 4a and 4b diagrammatically show glass moulding by the method according to the invention. FIG. 4a shows a mould part 3 into which a glass parison 35 has been introduced. A gas is brought into the escape space 11 below the glass parison 35 through the gas connection 15 at such a pressure that the glass parison 35 remains as if it were in a floating state. The formation of a cold layer 21 is then limited to a few spots where the parison lies against the mould part, so that no cold layer has yet been able to form near the cone tip to be moulded at the beginning of the moulding process. As a result the interspacing between the mould parts 3, 5 through which glass can continue to flow is greater than in the case of moulding according to the prior art, and the required compression force P at the end of the moulding process of the present invention is accordingly lower.

FIG. 5 shows the pressure gradient of the gas pressure provided in the escape space 11 during the manufacture of a cone. Time is plotted on the horizontal axis and pressure on the vertical axis. Cone manufacture is subdivided into four phases. At the beginning of phase I, the parison of material is brought into the first mould part and the parison is kept floating during phase I by means of the gas pressure p1. In phase II, the parison is moulded into the desired shape with a constant compression force, during which the pressure in the escape space is increased to p2. The pressure p2 provided is between 3 and 100 bar, depending on the size of the cone to be moulded and the wall thickness of the cone in the vicinity of the cone tip to be formed. After moulding, pressure is reduced to zero bar by gauge, after which during phase III the formed cone is cooled down. In phase IV, the cone is pressed from the first mould part by means of the gas pressure p3.

FIG. 6 shows a cone 37 manufactured by the method according to the invention. The cone tip 31 is comparatively long, i.e. compared with cones manufactured by the known methods. The cone wall thickness in the vicinity of the portion 29 of the cone tip 31 is approximately 1 to 10 mm.

The cone may be used, for example, in a cathode ray tube where the tip 31 formed at the cone is removed and a neck-shaped element is fastened in the opening formed thereby. An electron gun is subsequently fastened in this neck-shaped element. When a cone manufactured by the method according to the invention is used, fewer rejects occur in the manufacture of a cathode ray tube than with the use of a known cone. This is probably caused by the fact that the material in the narrow portion of the cone according to the present invention contains fewer mechanical stresses than the known cone, so that fastening of the electron gun to the cone leads less quickly to material fracture in the cone.

The method of manufacturing a hollow cone may also be used for other products such as funnels, and products having a hollow, conical projection.

The escape space may be blocked, not only by means of gas pressure, but also, for example, by means of a spring-loaded mechanical valve which opens automatically when the pressure exerted thereon exceeds a previously defined value.

What is claimed is:

1. A method of manufacturing a hollow cone having an open side and a cone tip, said hollow cone being formed in a first mold portion, said first mold portion having an escape space, said method comprising the steps of:

introducing a viscous material into said first mold portion;

providing a gas pressure in said escape space so as to at least initially prevent said viscous material from flowing into said escape space;

introducing a second mold portion and contacting said viscous material therewith such that said viscous material is intermediate said first and second mold portions;

forming said open side of said hollow cone by initially pressing said first and second mold portions together while said gas pressure prevents said viscous material from flowing into said escape space; and continuing to press said first and second mold portions together until a pressure is created in the viscous material sufficient to cause some of said viscous material to flow into said escape space.

2. The method according to claim 1, wherein said step of preventing said viscous material from flowing into said escape space is carried out by applying a gas pressure of a defined value.

3. The method according to claim 1, wherein said gas pressure in said escape space causes said viscous material to float in said first mold portion until said first and second mold portions are initially pressed together.

4. The method according to claim 1, wherein said hollow cone is removed from said first mold portion by gas pressure provided into said escape space after molding of said hollow cone is completed.

5. A method of manufacturing a hollow cone, the hollow cone being formed between a first mold portion and a second mold portion, the first mold portion having an escape space, said method comprising the steps of:

introducing a viscous material into the first mold portion;

providing a gas pressure in the escape space so as to at least initially prevent the viscous material from flowing into the escape space;

contacting the viscous material with the second mold portion such that the viscous material becomes positioned between the first and second mold portions; and pressing the first and second mold portions together to deform the viscous material into a hollow cone shape between the first and second mold portions, the pressing together of the first and second mold portions initially causing a pressure in the viscous material that does not exceed the gas pressure in the escape space so that the viscous material deforms initially without flowing into the escape space, the pressing together of the first and second mold portions thereafter causing an increased pressure in the viscous material that does exceed the gas pressure in the escape space so that some of the viscous material flows into the escape space.

6. The method according to claim 5, wherein the gas pressure in the escape space is adjustable during formation of the hollow cone.

7. The method according to claim 5, wherein the gas pressure in the escape space causes the viscous material to float in the first mold portion until the first and second mold portions are initially pressed together.

8. The method according to claim 5, wherein the hollow cone is removed from the first mold portion by gas pressure provided into the escape space after molding of the hollow cone is completed.

* * * * *